United States Patent
Geren et al.

(10) Patent No.: US 7,145,313 B2
(45) Date of Patent: *Dec. 5, 2006

(54) BATTERY PROTECTION CIRCUIT FOR SIMULATING AN OVERCURRENT CONDITION BASED ON BATTERY CURRENT FLOW

(75) Inventors: Michael D. Geren, Suwanee, GA (US); Jennifer K. Collier, Dunsany (IE); John E. Herrmann, Sugar Hill, GA (US)

(73) Assignee: Motorola Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/880,209

(22) Filed: Jun. 29, 2004

(65) Prior Publication Data
US 2005/0285572 A1 Dec. 29, 2005

(51) Int. Cl.
*H01M 10/46* (2006.01)
(52) U.S. Cl. .................................... 320/134
(58) Field of Classification Search ............. 320/134, 320/136
See application file for complete search history.

(56) References Cited

U.S. PATENT DOCUMENTS

| | | | | |
|---|---|---|---|---|
| 5,164,652 A | * | 11/1992 | Johnson et al. | 320/106 |
| 5,185,566 A | * | 2/1993 | Goedken et al. | 320/113 |
| 5,767,657 A | * | 6/1998 | Oglesbee | 320/101 |
| 6,903,533 B1 | * | 6/2005 | Geren et al. | 320/134 |

OTHER PUBLICATIONS

U.S. Appl. No. 10/737,021, Geren et al.
U.S. Appl. No. 10/811,665, Geren.
U.S. Appl. No. 10/185,095, Oglesbee.

* cited by examiner

*Primary Examiner*—Edward H. Tso
(74) *Attorney, Agent, or Firm*—Hisashi D. Watanabe

(57) ABSTRACT

A battery protection circuit is provided that includes current monitoring circuit. The current monitoring circuit senses current flowing to or from a rechargeable cell. When the current exceeds a maximum value, the current monitoring circuit actuates, whereby opening a transistor. The transistor has a resistor couple in parallel. When the transistor opens, current is forced through the resistor coupled in parallel with the transistor, thereby limiting the current to a maximum value. The current monitoring circuit also simulates an overcurrent condition in the safety circuit. The overcurrent condition causes a disconnect switch to open, thereby disconnecting the cell(s) from the external terminals.

15 Claims, 3 Drawing Sheets

BATTERY PROTECTION CIRCUIT FOR SIMULATING AN OVERCURRENT CONDITION BASED ON BATTERY CURRENT FLOW

BACKGROUND

1. Technical Field

This invention relates generally to protection circuits for rechargeable battery packs, and more specifically to protection circuits that disable a rechargeable battery pack due to an excessive amount of current or power being supplied to the load.

2. Background Art

Portable electronic devices, like cellular telephones, pagers and two-way radios for example, derive their portability from rechargeable batteries. Such batteries allow these devices to slip the surly bonds of wall mounted power supplies and wirelessly touch the hand of the user wherever he may be.

While many people may think that a rechargeable battery is simply a cell and a plastic housing, nothing could be further from the truth. Rechargeable battery packs often include circuit boards, electronic circuitry, mechanical assemblies and electromechanical protection components. The circuits employed in rechargeable battery packs include charging circuits that control current, fuel gauging circuits, temperature measurement circuits and indicator circuits, just to name a few. Simply put, a battery pack is a complex system of components working in harmony to safely deliver power to the electronic device.

One of the most fundamental circuits in a battery pack is the protection circuit. Rechargeable battery performance, especially with respect to those having cells constructed of lithium-based materials, may be severely compromised if the cell within the battery pack is over or under charged. For this reason, most all high-quality battery packs include one form of safety circuit or another.

Typical safety circuits include voltage and current limits. As such, when the voltage across the cell in a battery pack becomes too high or too low, the safety circuit will open switches within the pack, thereby "turning off" the battery pack. Similarly, if the current flowing either into or out of the cell gets too high, the safety circuit will turn off the battery pack.

Despite these voltage and current safety mechanisms, new concerns are arising from "thermal" situations. These situations arise when a battery pack is operating within its voltage and current limits, but the internal temperature—which is proportional to the power being dissipated within the device—becomes too high for a particular application. The concern is that the thermal situation may cause components within the electronic device to become so hot that reliability of the overall system may become compromised. As power dissipation is proportional to the current flowing through a device, excess current is often the fundamental cause of increased internal temperature.

There is thus a need for an improved battery safety circuit that not only turns off the battery not only due to excessive voltage or current, ensures that thermal situations do not arise.

DETAILED DESCRIPTION OF THE INVENTION

Figure 1:
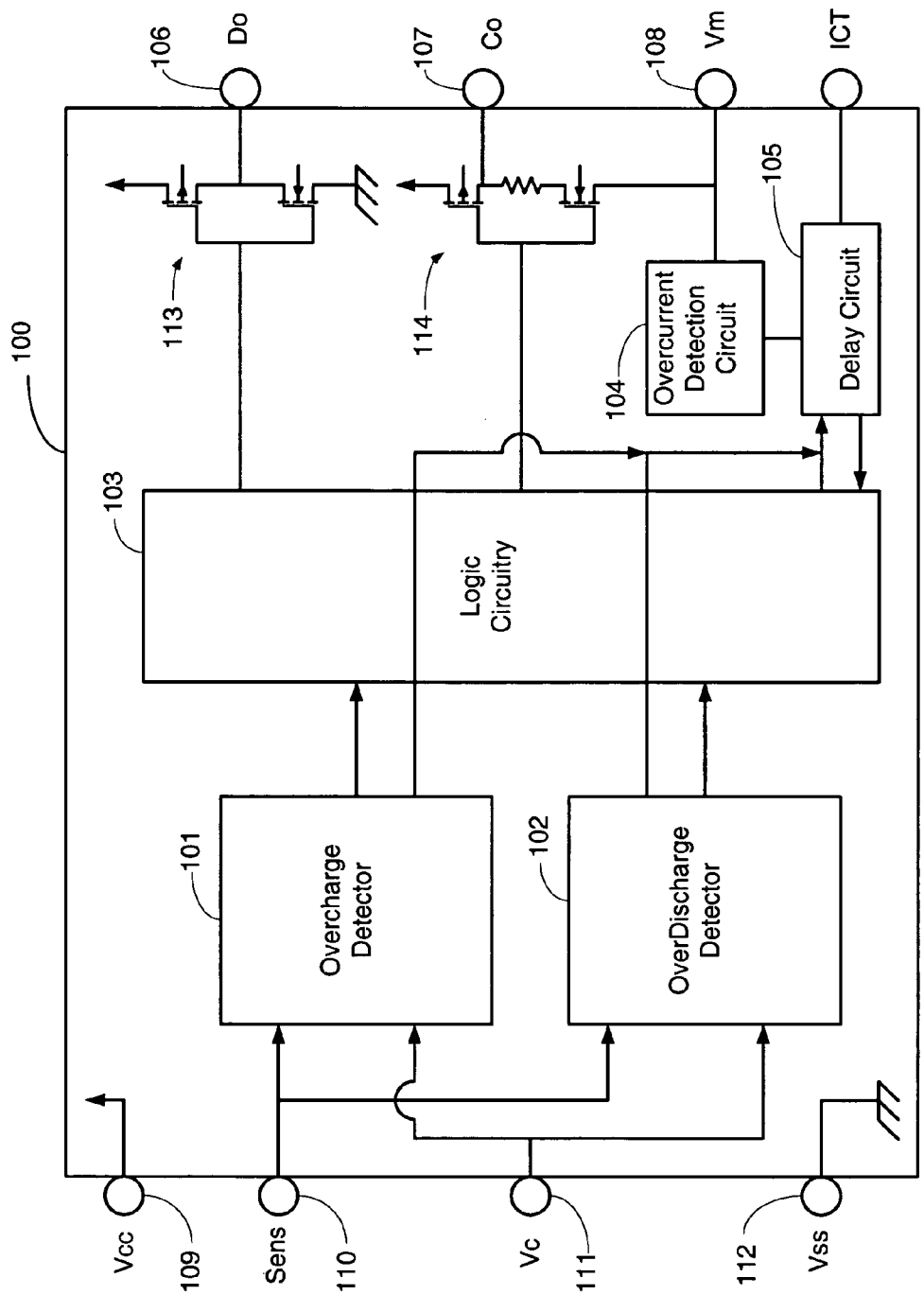
FIG. 1 illustrates a block diagram of a safety circuit IC.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Copending, commonly assigned application Ser. No. 10/737,021, entitled "Power Fault Battery Protection Circuit", filed Dec. 16, 2003, which is included herein by reference, teaches a circuit that simulates an overcurrent condition in a battery safety circuit when power being delivered to or from a rechargeable cell exceeds a predetermined threshold, like 9 watts for example. This circuit prevents current flow to or from the battery when this threshold is exceeded, with the goal of preventing the overall battery pack from overheating.

Similarly, copending, commonly assigned application Ser. No. 10/811,665, entitled "Battery Protection Circuit, filed Mar. 26, 2004, which is included herein by reference, teaches a circuit that simulates an overcurrent condition in a battery safety circuit when any number of parameters, including power or pulsed current, exceed a predetermined threshold.

The present application also teaches a circuit for simulating an overcurrent condition in a battery safety circuit. The overcurrent condition of the present invention is simulated when the current flowing to or from a rechargeable cell in the battery pack exceeds a predetermined current threshold. The present invention includes a conventional safety circuit, but also includes an additional safety circuitry that limits current to a maximum value. While the conventional circuit is only capable of stopping current, the additional safety circuitry includes an additional limiting function.

The additional safety circuit includes a transistor coupled serially with the rechargeable cell, and a resistor having a relatively low impedance coupled in parallel with the transistor. This current limiting circuit ensures that the current does not exceed a predetermined maximum value (like 2 Amps, for example) while the overcurrent condition in the safety circuit is being simulated. The current limiting circuit has a quicker transient response time than does the safety circuit. As such, the invention offers a protection circuit that can act "faster" than can a traditional safety circuit.

Prior to understanding the power monitoring circuit, a brief overview of battery safety circuits is warranted. As used herein, a "safety circuit" is any circuit capable of monitoring the voltage across at least one rechargeable cell, in addition to being capable of monitoring the current flowing through the cell or cells. One example of such a circuit is the S8232 series of safety circuits manufactured by Seiko Instruments, Inc. For discussion and exemplary purposes, such a circuit will be discussed herein. It will be clear to those of ordinary skill in the art who have the benefit of this disclosure, however, that the invention is not so limited. Discrete circuits, application specific circuits and safety circuits manufactured by other companies, including Ricoh and Mitsumi for example, may be equally substituted for the Seiko circuit.

By way of background, referring now to FIG. 1, illustrated therein is a block diagram of an S-8232 safety circuit 100. The S-8232 safety circuit is designed to be used with two, serial, lithium-based cells. Again, it will be clear to those of ordinary skill in the art with the benefit of this disclosure that the invention is not so limited. The overpower circuit discussed herein may be equally applied to any combination of serial or parallel cells.

The safety circuit 100 may be as simple as a single integrated circuit (IC) that provides a means for monitoring of cell voltage and current, and thereby controls the charging and discharging of the cells within a battery pack. Discrete equivalents of the IC may also be substituted. The safety circuit 100 includes an overcharge detector 101 that monitors the voltages across the corresponding cells. The overcharge detector 101 compares these voltages to a predetermined maximum cell voltage. When the cell voltage exceeds this threshold, the overcharge detector 101, via some internal logic circuitry 103, causes a push-pull output stage 114 to actuate the charge pin 107. When the charge pin 107 is coupled to a disconnect means, like a transistor acting as a switch in its non-linear region, actuation will prevent any further charging of the cells.

Similarly, the safety circuit includes an overdischarge detector 102 that ensures that the voltage across the cells does not fall below a predetermined threshold. If it does, the overdischarge detector 102 causes an output stage 113 to actuate the discharge pin 106. When the discharge pin 106 is coupled to a disconnect means, like a serial transistor, actuation prevents any further discharge of the cells.

Cell current is monitored by way of an overcurrent detection pin 108 coupled to an overcurrent detection circuit 104. The overcurrent detection pin 108 senses the voltage between the Vss pin 112 and the overcurrent detection pin 108. When this voltage exceeds a predetermined threshold, as will be explained in more detail later, the overcurrent circuit 104 causes the discharging pin 106 to actuate, thereby stopping the flow of current in the discharge direction. In some situations, with some safety circuits, the charging pin 107 may also actuate.

When the load is removed, as evidenced by an impedance greater than 200 MΩ appearing between the Sens pin 110 and the overcurrent pin 108, the safety circuit 100 resets, thereby deactuating the discharge pin 106. This action will be more evident with the discussion of FIG. 2 below.

Other components of the safety circuit 100 include a Vcc pin 109, a center tap pin 111, and a Vss pin 112, that monitor the voltage at the cathode, between, and at the anode of serial cells, respectively. Additionally, a delay circuit 105 provides some hysteresis and transient immunity.

Figure 2:
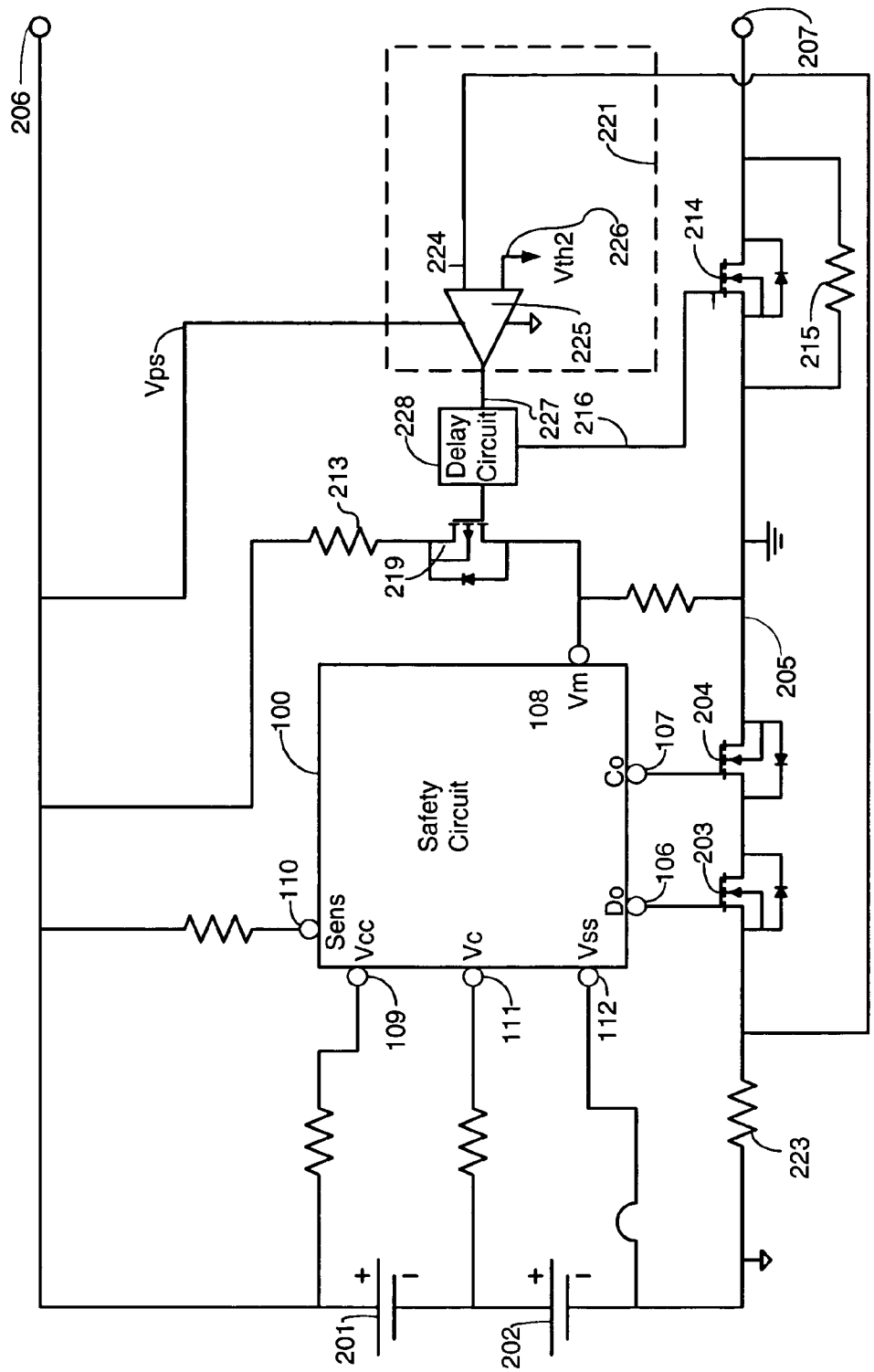
FIG. 2 illustrates a protection circuit having a current detection circuit and current limiting circuit in accordance with the invention.

Referring now to FIG. 2, illustrated therein is one preferred embodiment of a battery protection circuit in accordance with the invention. The safety circuit 100 from FIG. 1 is coupled to a pair of rechargeable cells 201,202. The charge pin 107 and the discharge pin 106 are coupled to disconnect elements 203,204, respectively, which are in turn coupled serially with the cells 201,202. The disconnect elements 203,204 in this exemplary embodiment are field effect transistors (FETs), although other devices, including switches, relays, circuit breakers, positive temperature coefficient devices and controllable fuses may be substituted, depending upon the application.

The overcurrent pin 108 is coupled to the low side 205 of the circuit, such that the overcurrent pin 108 may work in conjunction with the Vss pin 112 to sense the voltage across the FETs 203,204. When this voltage becomes too high, the safety circuit 100 knows that the current being drawn from the cells 201,202 is correspondingly too high.

When this "overcurrent situation" occurs, the discharge pin 106 causes FET 203 to open, thereby preventing current from flowing to the external terminals 206,207. The safety circuit 100 resets itself, and thus closes FET 203, when an impedance greater than 200 MΩ is sensed between the Sens pin 110 and the overcurrent pin 108. This happens when a load (not shown) is removed from the terminals 206,207, thereby creating essentially an open circuit between the terminals 206,207.

While the safety circuit 100 does disconnect the cells 201,202 from the terminals 206,207 when current gets too high, the safety action of the safety circuit 100 can be to slow, at too high a current for some applications. Additionally, the safety circuit 100 is not capable of limiting current to a maximum value.

This invention provides a solution to these problems by providing a current monitoring circuit 221 for sensing the amount of current flowing to, from or through the rechargeable cells 201,202. The current monitoring circuit 221 is coupled to a transistor 214 that is coupled serially with the cells 201,202. When the current exceeds a predetermined current threshold, the output 227 of the current monitoring circuit 221 transitions from a first state to a second state, thereby causing the transistor 214 to open, or enter a high impedance state.

The current monitoring circuit 221, in this embodiment, includes a comparator 225 having a first input 224, a second input 226 and an output 227. A voltage proportional to current is coupled to the first input 224. This proportional voltage is established by a current sense resistor 223 coupled serially with the cells.

A voltage reference (Vth2) that corresponds to the predetermined current limit is coupled to the second input 226. When the voltage proportional to current exceeds the reference voltage, the comparator output 227 switches from a first state to a second state. This switching causes two events to occur. First, the transistor 214 opens, or enters a high impedance state. Second, an overcurrent condition is simulated in the safety circuit 100 when transistor 219 closes, thereby sourcing current into the Vm pin 108 of the safety circuit 100.

Examining transistor 214 more closely, during normal operation, transistor 214 is closed. In other words, it is in its fully conducting, saturated mode, thereby providing a low impedance path for current to flow to or from the cells 201,202. When actuated, the transistor 214 enters a high impedance state, thereby forcing current through a resistor 215 coupled in parallel with the transistor 214. This resistor 215, preferably having an impedance less than 100 Ohms, limits current flowing to or from the cells 201,202 to a maximum value. Experimental results have shown that a resistor having an impedance of about 8 Ohms works well for portable radio applications.

The advantage that the current monitoring circuit 221, the transistor 214 and parallel resistor 215 offer is that the transient response time is orders of magnitude quicker than the response time of the safety circuit 100. Consequently, while a protection circuit having a safety circuit alone may actuate in milliseconds, the current monitoring circuit is capable of actuating in microseconds, thereby protecting the load from overcurrent conditions that may compromise reliability.

Examining the overcurrent condition more closely, when the comparator 225 actuates, current monitoring circuit 221 simulates an overcurrent condition within the safety circuit 100, causing FET 203 to open, or enter a high impedance state, thereby preventing current from flowing from the cells 201,202. The overcurrent condition is simulated by sourcing current into the overcurrent pin 108 (as a result of increased voltage at the overcurrent pin 108), and thus into the overcurrent detection circuit within the safety circuit 100.

A switch 219, shown here as a FET, is responsive to the comparator 225 and closes upon a change in the state of the comparator output 227. This transistor closing pulls the overcurrent pin 108 to the cell voltages through current limiting resistor 213, thereby causing current to flow into the overcurrent pin 108. To the safety circuit 100, this appears to be an actual overcurrent situation in the battery pack. The safety circuit 100 then opens the discharge FET 203, thereby preventing any current from flowing out of the cells 201, 202. As such, the cells 201,202 are effectively disconnected from the terminals 206,207 as a result of current exceeding the predetermined threshold. As stated, when the simulated overcurrent condition is initiated, the cells 201,202 are disconnected from the terminals 206,207 by way of FET 203. As the response time of the current monitoring circuit 221, the transistor 214 and parallel resistor 215 can be several orders of magnitude quicker than the response time of the safety circuit 100, a delay circuit 228 may be included to ensure the FET 219 remains closed for a predetermined period of time pertinent to the internal delay time in the safety IC.

Figure 3:
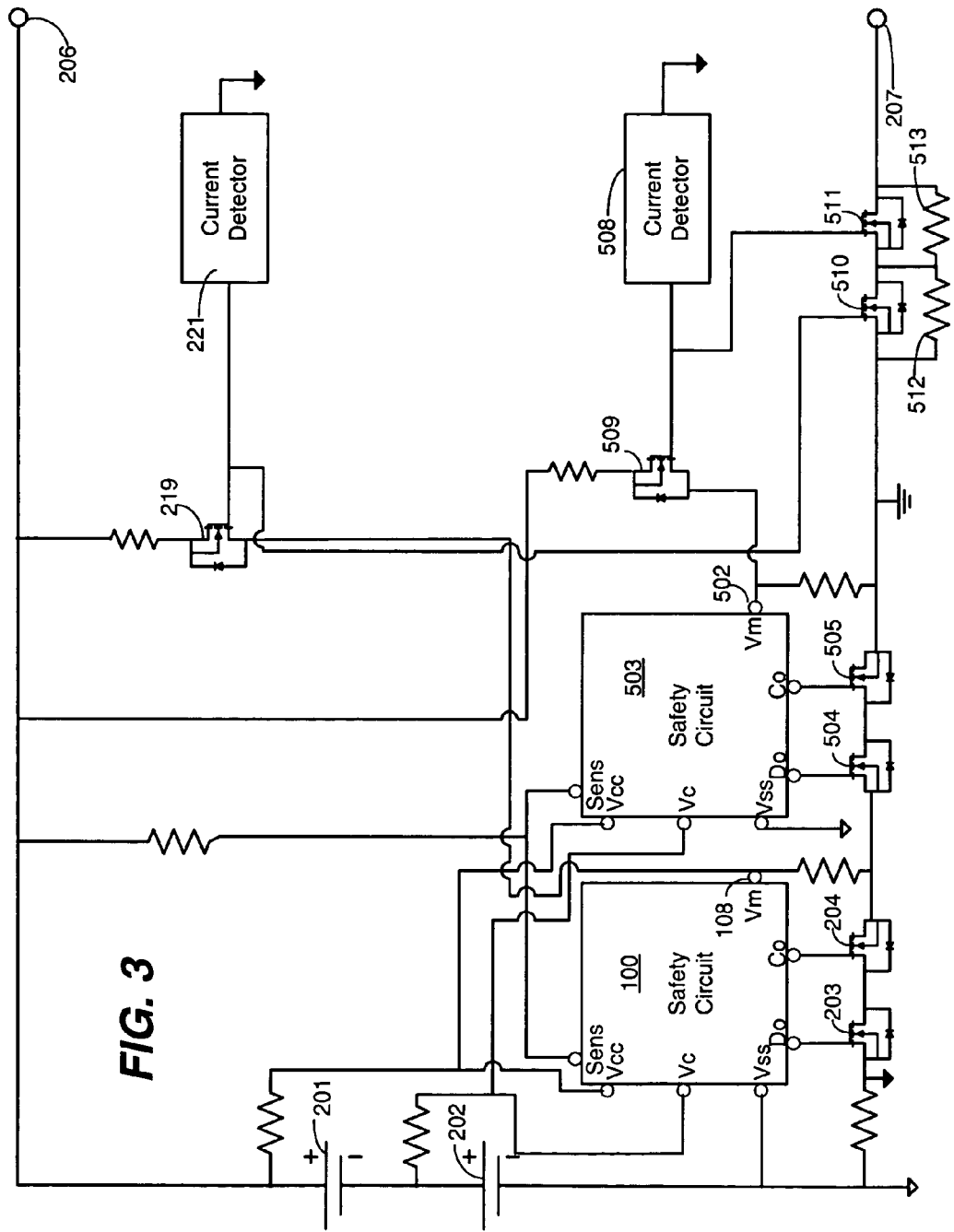
FIG. 3 illustrates a protection circuit having a plurality of current detection circuits and current limiting circuits in accordance with the invention.

Referring now to FIG. 3, illustrated therein is a battery circuit having redundant safety circuits 100,503. The first safety circuit 100 is coupled to a charge 203 and discharge 204 transistor, while the second safety circuit 503 is coupled to a second charge 504 and discharge 505 transistor. The duplicity of safety circuits 100,503 offers added reliability, in that if either one or the other of the safety circuits fails, the remaining one will offer charge protection.

Corresponding with the plurality of safety circuits 100, 503 is a first 221 and second 508 current monitoring circuits. Each current monitoring circuit 221,508 is coupled to a corresponding overcurrent monitoring pin 108,502. Each current monitoring circuit 221,508 comprises a comparator and voltage reference, as was the case in FIG. 2.

When either of the current monitoring circuits 221,508 senses that current has exceeded a predetermined threshold, an overcurrent condition will be simulated in the corresponding safety circuits 100,503 by way of transistors 219,509. The circuit of FIG. 3 offers a highly reliable battery circuit that ensures that components within the battery will not become overheated during operation due to excessive currents.

Each current monitoring circuit 221,508 is coupled to a transistor 510,511. The transistors 510,511 are coupled serially with the cells 201,202. The transistors 510,511 have resistors 512,513 coupled in parallel. When either (or both) current monitoring circuit 221,508 actuates, the corresponding transistor 510,511 opens, thereby forcing current through the corresponding resistor 512,513. The resistor 512,513 limits current flowing to or from the cells to a maximum value determined by Ohm's Law.

The predetermined current thresholds are set in the charge monitoring circuits 221,508 by reference voltages as was described in with respect to FIG. 2. When the current exceeds a predetermined threshold, like 2 Amps for example, the current detectors actuate the transistors 510, 511.

As with FIG. 2, in normal operation, the transistors 510,511 are closed, or in their saturated, conducting mode, thereby offering the current a low-impedance path to and from terminal 207 to the cells 201,202. When current exceeds a predetermined threshold however, the current monitors 221,508 open the transistors 510,511, thereby placing them in a high-impedance state. When this occurs, current is forced through resistors 512,513. The impedance of these resistors is less than 100 Ohms, and preferably less than 10 Ohms. As noted above, a resistance value of 8 Ohms has been shown in experimental tests to work well.

As stated, one advantage of including the transistors 510,511 and resistors 512,513 is that the current monitors 221,508 are able to open them very quickly, thereby limiting the current that may be delivered from the pack while other components actuate.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while one preferred embodiment of the invention is a rechargeable battery pack comprising the battery protection circuit taught in FIG. 2, the invention is not so limited. It may be applied to any power source, including power supplies, fuel cells, solar cells and the like. Additionally, it may be incorporated into the host device as well as within the battery pack.

What is claimed is:

1. A battery protection circuit, comprising:
   a. at least one rechargeable cell;
   b. a safety circuit coupled to the at least one rechargeable cell, the safety circuit comprising a voltage monitoring circuit and a current monitoring circuit;
   c. at least one disconnect element coupled serially with the at least one rechargeable cell;
   d. a current monitoring circuit;
   e. a circuit for simulating an overcurrent condition within the safety circuit when the current monitoring circuit determines that the current flowing to or from the at least one rechargeable cell exceeds a predetermined current threshold;
   f. a transistor coupled serially with the at least one rechargeable cell; and
   g. a resistor having an impedance less than 100 Ohms coupled in parallel with the transistor;
   wherein when the current flowing to or from the at least one rechargeable cell exceeds the predetermined current threshold, the current monitoring circuit causes the transistor to enter a high-impedance state.

2. The circuit of claim 1, wherein predetermined current threshold less than 2 Amps.

3. The circuit of claim 1, wherein the at least one disconnect element is selected from the group consisting of transistors, switches, relays, circuit breakers, and fuses and positive temperature coefficient devices.

4. The circuit of claim 1, wherein the current monitoring circuit comprises:
   a. a comparator having at least a pair of inputs, wherein a voltage proportional to the current flowing to or from the at least one rechargeable cell is coupled to a first input; and
   b. a reference voltage coupled to a second input.

5. The circuit of claim 4, wherein an output of the comparator is in a first state when the first input is at a level below the second input; further wherein the output of the comparator is in a second state when the first input is at a level above the second input.

6. The circuit of claim 1, wherein the safety circuit comprises:
   a. an overcharge detector;
   b. an undercharge detector; and
   c. an overcurrent detection circuit.

7. The circuit of claim 6, wherein the overcurrent situation is simulated by sourcing current into the overcurrent detection circuit.

8. A rechargeable battery pack comprising the circuit of claim 1.

9. A battery protection circuit having an current monitoring circuit, wherein the current monitoring circuit determines when a current exceeds a predetermined threshold, comprising:
   a. at least one rechargeable cell;
   b. at least one safety circuit coupled to the at least one rechargeable cell;
   c. at least one switch coupled serially with the at least one rechargeable cell;
   d. at least one circuit for simulating an overcurrent condition within the safety circuit when the current monitoring circuit determines that the current exceeds the predetermined threshold;
   e. a transistor coupled serially with the at least one rechargeable cell; and
   f. a resistor having an impedance less than 100 Ohms coupled in parallel with the transistor;
   wherein when the current exceeds a predetermined current threshold, the current
   monitoring circuit causes the transistor to enter a high-impedance state.

10. The circuit of claim 9, wherein when the at least one circuit for simulating an overcurrent condition within the safety circuit simulates an overcurrent condition, the at least one switch enters a high impedance state.

11. The circuit of claim 10, wherein the at least one switch is selected from the group consisting of transistors, switches, relays, circuit breakers, and fuses and positive temperature coefficient devices.

12. The circuit of claim 9, wherein the current monitoring circuit comprises:
   a. an impedance for sensing the current flowing through the at least one rechargeable cell; and
   b. a comparator, wherein the comparator determines whether the current exceeds the predetermined threshold.

13. The circuit of claim 12, wherein an output of the comparator is in a first state when the current flowing through the at least one rechargeable cell is below the predetermined threshold; further wherein the output of the comparator is in a second state when the current flowing through the at least one rechargeable cell is above the predetermined threshold.

14. The circuit of claim 13, wherein the predetermined threshold is less than 2 Amps.

15. The circuit of claim 14, wherein the safety circuit comprises:
   a. an overcharge detector;
   b. an undercharge detector; and
   c. an overcurrent detection circuit;
   wherein the overcurrent situation is simulated by sourcing current into the overcurrent detection circuit.

* * * * *